United States Patent
Takeyama et al.

(10) Patent No.: US 8,879,145 B2
(45) Date of Patent: Nov. 4, 2014

(54) RAMAN AMPLIFIER

(71) Applicants: Fujitsu Limited, Kawasaki (JP); Fujitsu Telecom Networks Limited, Kawasaki (JP)

(72) Inventors: Tomoaki Takeyama, Yokohama (JP); Shingo Hara, Kawasaki (JP); Kosuke Komaki, Kawasaki (JP); Shota Mori, Kawasaki (JP)

(73) Assignees: Fujitsu Limited, Kawasaki (JP); Fujitsu Telecom Networks Limited, Kawasaki (JP)

( * ) Notice: Subject to any disclaimer, the term of this patent is extended or adjusted under 35 U.S.C. 154(b) by 0 days.

(21) Appl. No.: 14/087,438

(22) Filed: Nov. 22, 2013

(65) Prior Publication Data

US 2014/0146385 A1 May 29, 2014

(30) Foreign Application Priority Data

Nov. 29, 2012 (JP) .................................. 2012-261722

(51) Int. Cl.
*H01S 3/30* (2006.01)

(52) U.S. Cl.
USPC ........................ 359/344; 359/337; 359/341.44

(58) Field of Classification Search
USPC ..................... 359/344, 337, 341.44
See application file for complete search history.

(56) References Cited

U.S. PATENT DOCUMENTS

| 2002/0114060 A1 | 8/2002 | Kobayashi et al. |
| 2009/0169212 A1 | 7/2009 | Onaka et al. |
| 2009/0237778 A1* | 9/2009 | Onaka ............................ 359/334 |
| 2012/0177366 A1* | 7/2012 | Clouet ............................ 398/30 |
| 2014/0077971 A1* | 3/2014 | Archambault et al. .. 340/870.04 |

FOREIGN PATENT DOCUMENTS

| JP | 2002-252595 | 9/2002 |
| JP | 2004-287307 | 10/2004 |
| JP | 2009-159290 | 7/2009 |

* cited by examiner

*Primary Examiner* — Mark Hellner
(74) *Attorney, Agent, or Firm* — Staas & Halsey LLP

(57) ABSTRACT

Raman amplifier includes: a pump-light generator configured to supply pump light to a transmission fiber; a measurement circuit configured to measure a relationship between power of the pump light and power of noise output from the transmission fiber with respect to a range from first pump-light power to second pump-light power; a signal detector configured to monitor a supervisory signal in output light of the transmission optical; and a decision unit configured to decide a state of the transmission fiber according to the monitoring result. When the supervisory signal is detected without the pump light, the measurement circuit measures the relationship while increasing the power of the pump light from the first pump-light power. When the supervisory signal is not detected without the pump light, the measurement circuit measures the relationship while decreasing the power of the pump light from the second pump-light power.

8 Claims, 9 Drawing Sheets

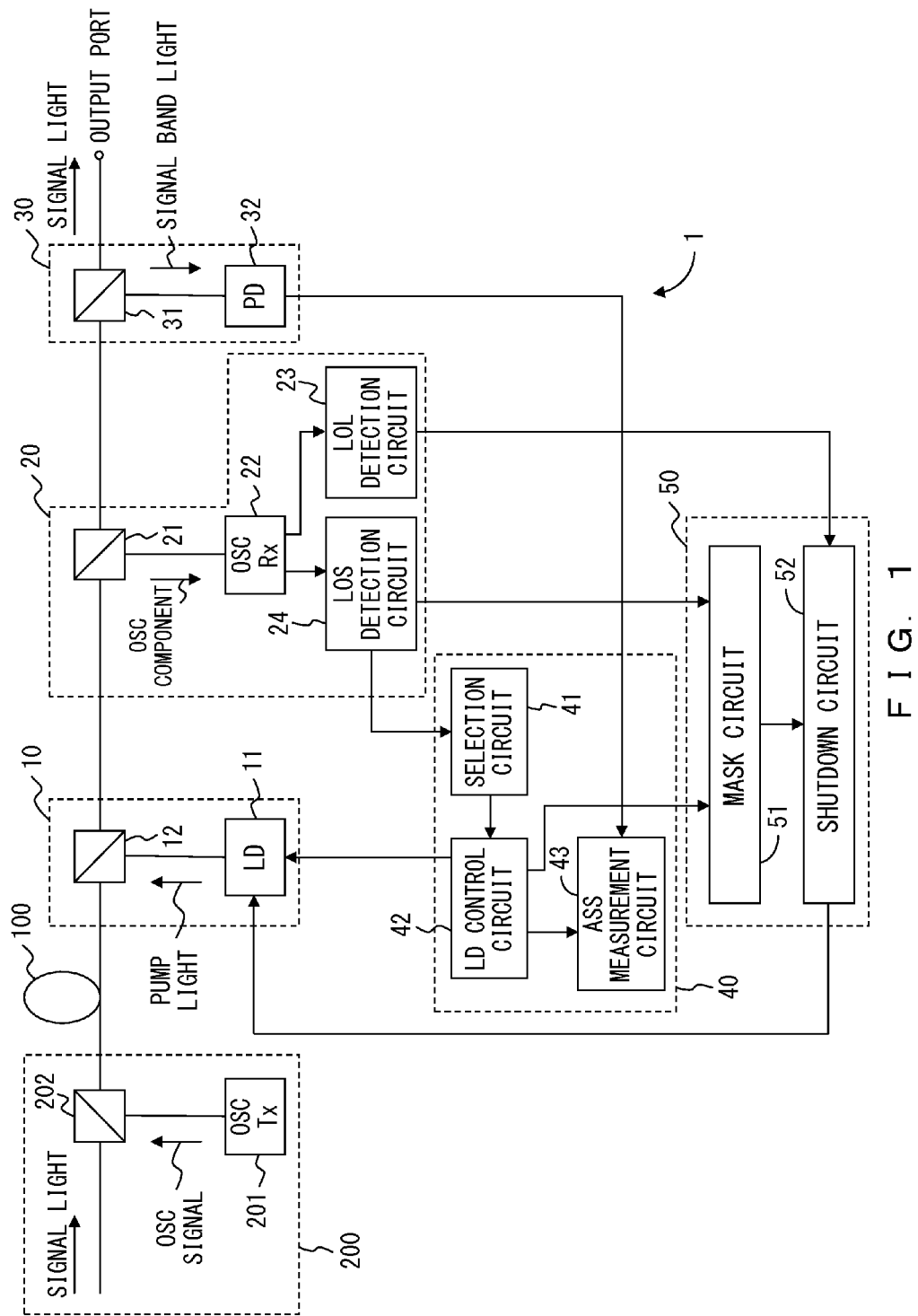
F I G. 1

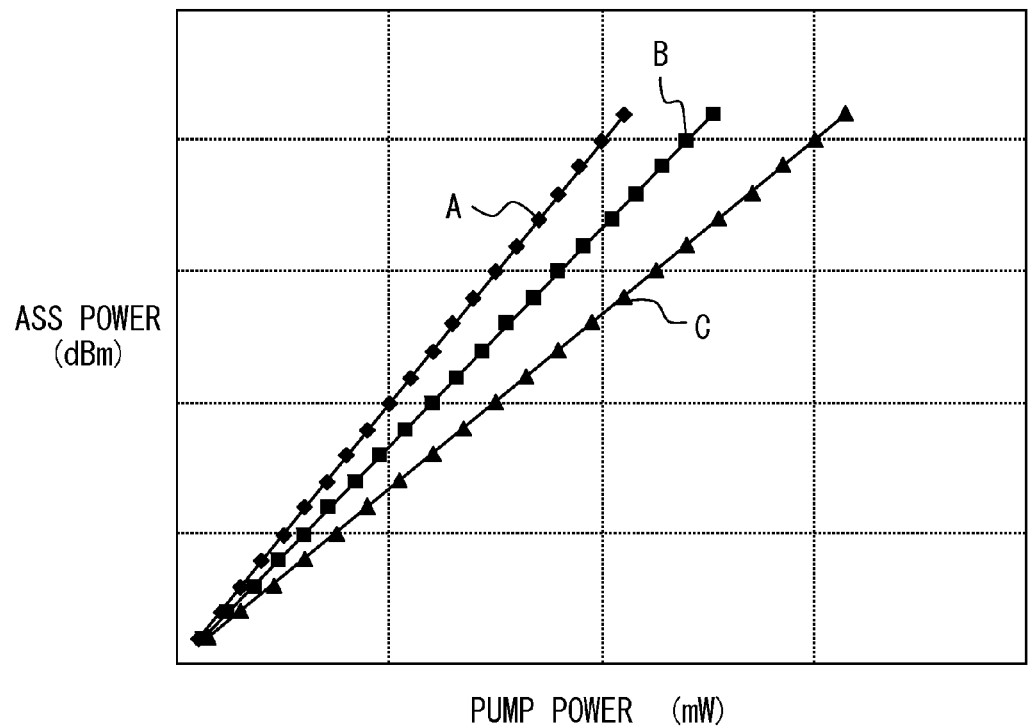
F I G. 2

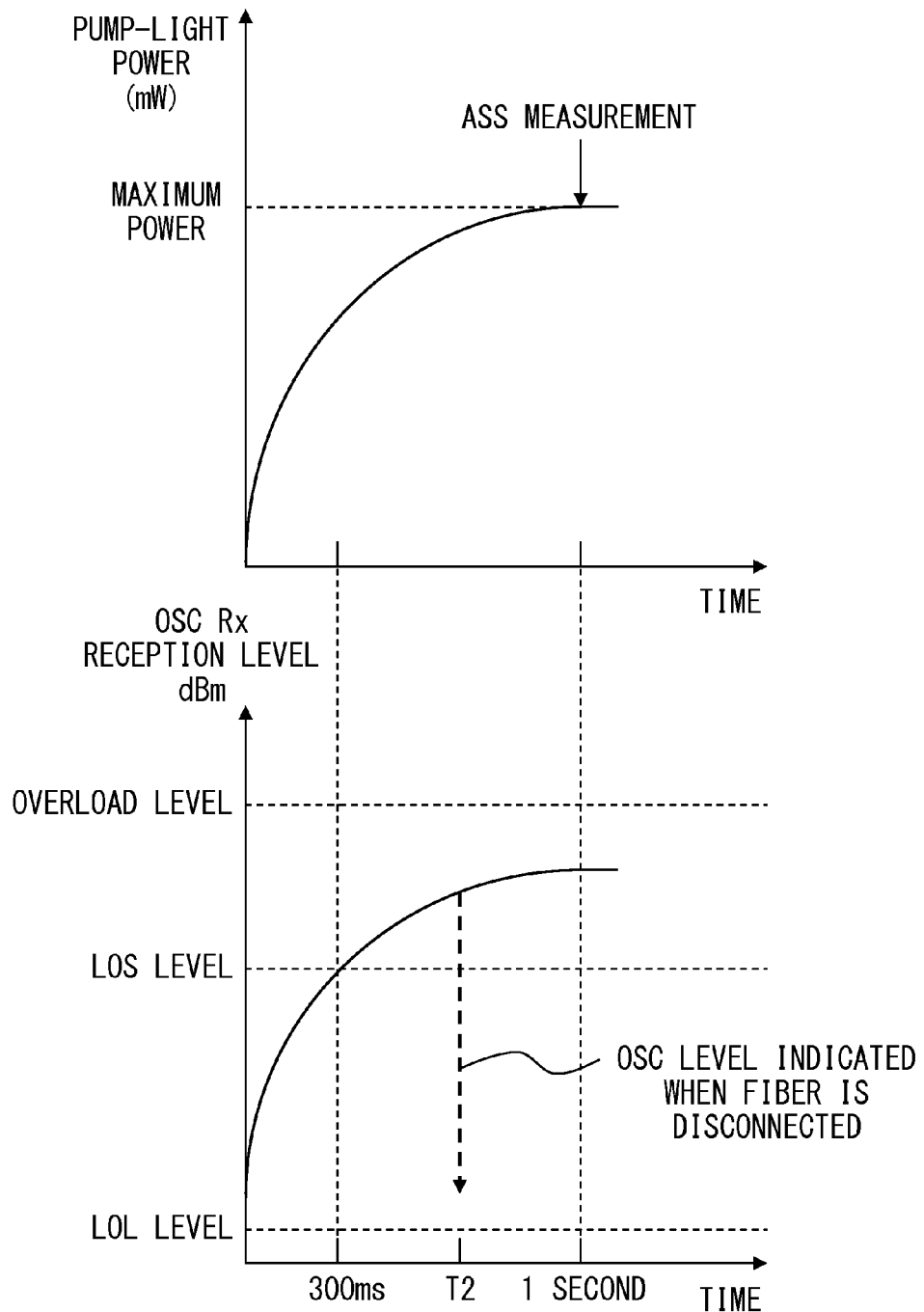
F I G. 7

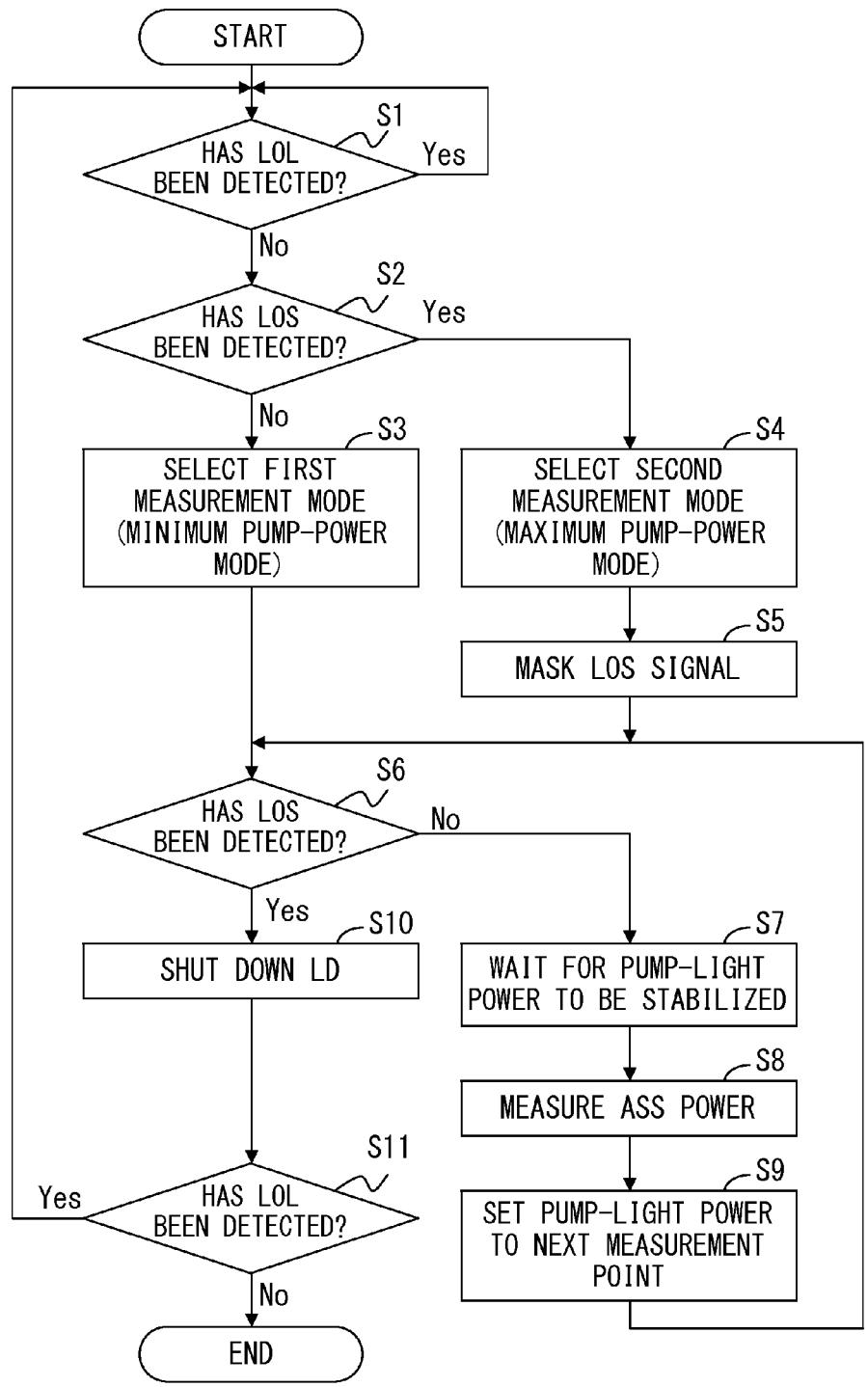
F I G. 8

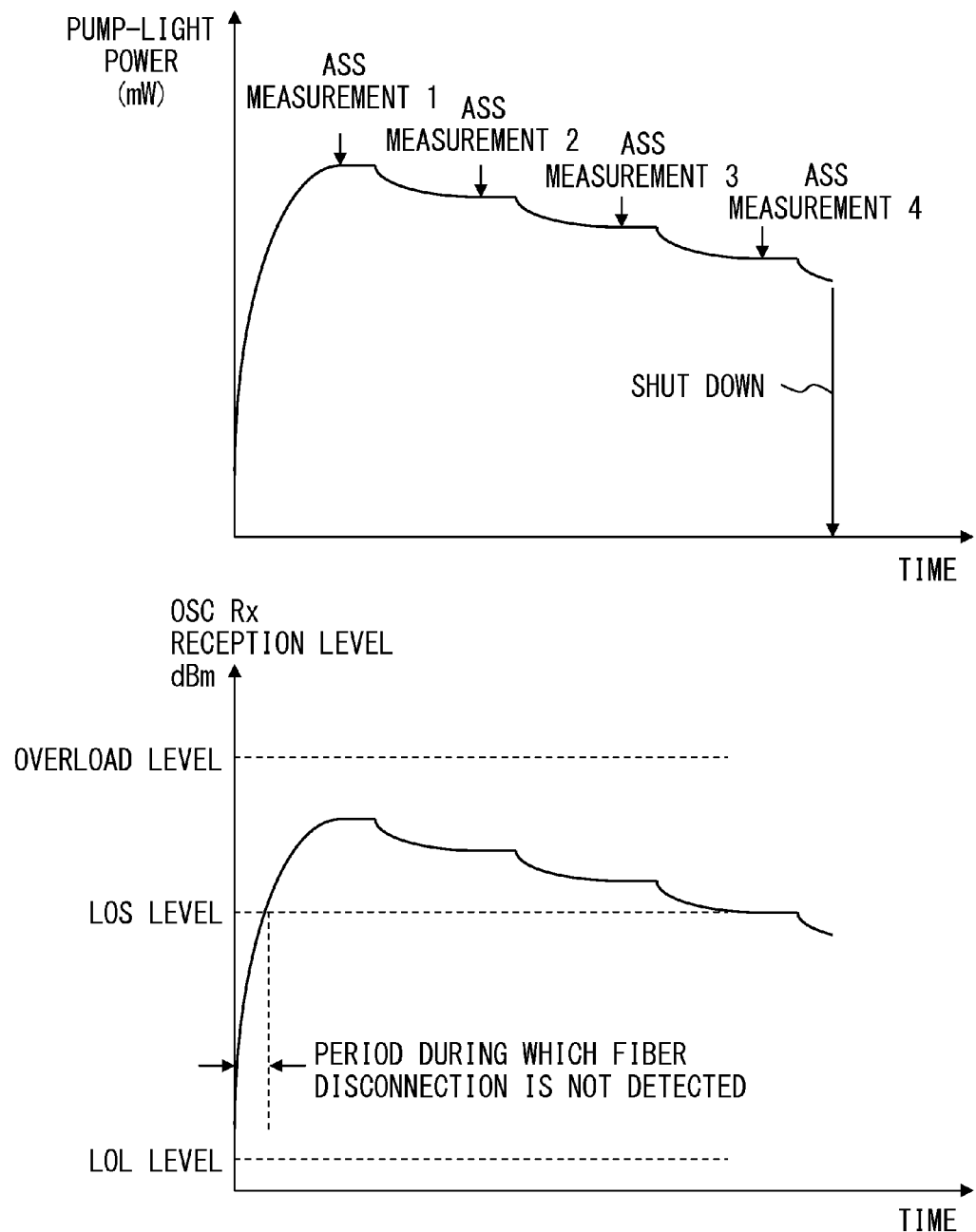
F I G. 9

RAMAN AMPLIFIER

CROSS-REFERENCE TO RELATED APPLICATION

This application is based upon and claims the benefit of priority of the prior Japanese Patent Application No. 2012-261722, filed on Nov. 29, 2012, the entire contents of which are incorporated herein by reference.

FIELD

The embodiments discussed herein are related to a Raman amplifier.

BACKGROUND

For optical transmission systems, erbium-doped fiber amplifiers (EDFAs), which are capable of collectively amplifying a wide wavelength region, are widely spread. However, in an optical transmission system that uses an EDFA as an optical amplifier, ASE (Amplified Spontaneous Emission) generated by the EDFA degrades an optical signal to noise ratio (OSNR). Accordingly, Raman amplifiers have tended to be widely spread as one type of an optical amplifier with little degradation in the OSNR.

In comparison with EDFAs, Raman amplifiers have low pump-light conversion efficiency. That is, to obtain sufficient gain using a Raman amplifier, a high-power pump light is supplied to a transmission optical fiber. Thus, a Raman amplifier may need to have a function to instantly stop pump light when a transmission optical fiber is disconnected.

Meanwhile, before an optical transmission system starts to be operated, a Raman amplifier measures the relationship between pump-light power and the power of ASS (Amplified spontaneous Raman Scattering). The relationship between pump-light power and ASS power does not depend on whether or not an optical signal is present. Thus, measuring in advance the relationship between pump-light power and ASS power allows the Raman amplifier to calculate the ASS power according to the pump-light power even while the optical transmission system is being operated. Accordingly, the Raman amplifier may detect the power of a pure optical signal by deducting the ASS power from the optical power detected by an optical receiver, thereby precisely controlling the gain.

Related arts are described in, for example, Japanese Laid-open Patent Publication No. 2004-287307, Japanese Laid-open Patent Publication No. 2002-252595, and Japanese Laid-open Patent Publication No. 2009-159290.

In the process of determining the aforementioned relationship between pump-light power and ASS power, the ASS power is measured while gradually changing the pump-light power. However, in Raman amplification it takes a long time to stabilize the gain after pump power is changed. In particular, a Raman amplifier provided with a cheap laser and/or a simplified driving circuit to decrease the cost may take about one second to stabilize the gain after pump-light power has been changed. Thus, when a transmission optical fiber is disconnected during the process of determining the relationship between pump-light power and ASS power, the Raman amplifier may be unable to instantly detect the fiber disconnection.

As described above, conventional Raman amplifiers may be unable to determine the state of a transmission optical fiber for a long time. Thus, the prior art may be incapable of instantly stopping pump light when a transmission optical fiber is disconnected.

SUMMARY

According to an aspect of the embodiments, a Raman amplifier includes: a pump-light generator configured to supply pump light to a transmission optical fiber; a measurement circuit configured to measure a relationship between power of the pump light and power of noise output from the transmission optical fiber with respect to a range from first pump-light power to second pump-light power that is higher than the first pump-light power; a signal detector configured to monitor a supervisory signal transmitted from a transmission equipment provided at a transmitting end of the transmission optical fiber in output light of the transmission optical fiber; and a decision unit configured to decide a state of the transmission optical fiber according to a monitoring result provided by the signal detector. When the supervisory signal is detected by the signal detector while the pump light is not supplied to the transmission optical fiber, the measurement circuit measures the relationship while increasing the power of the pump light from the first pump-light power to the second pump-light power. When the supervisory signal is not detected by the signal detector while the pump light is not supplied to the transmission optical fiber, the measurement circuit measures the relationship while decreasing the power of the pump light from the second pump-light power to the first pump-light power.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an exemplary configuration of a Raman amplifier in accordance with an embodiment.

FIG. 2 illustrates a relationship between pump-light power and ASS power.

FIG. 7 illustrates a change in pump-light power at the start of measurement and a change in the optical power of an OSC wavelength component at the start of measurement.

FIG. 8 is a flowchart illustrating a method for measuring a relationship between pump-light power and ASS power.

FIG. 9 illustrates an exemplary operation of a Raman amplifier.

DESCRIPTION OF EMBODIMENTS

Figure 3:
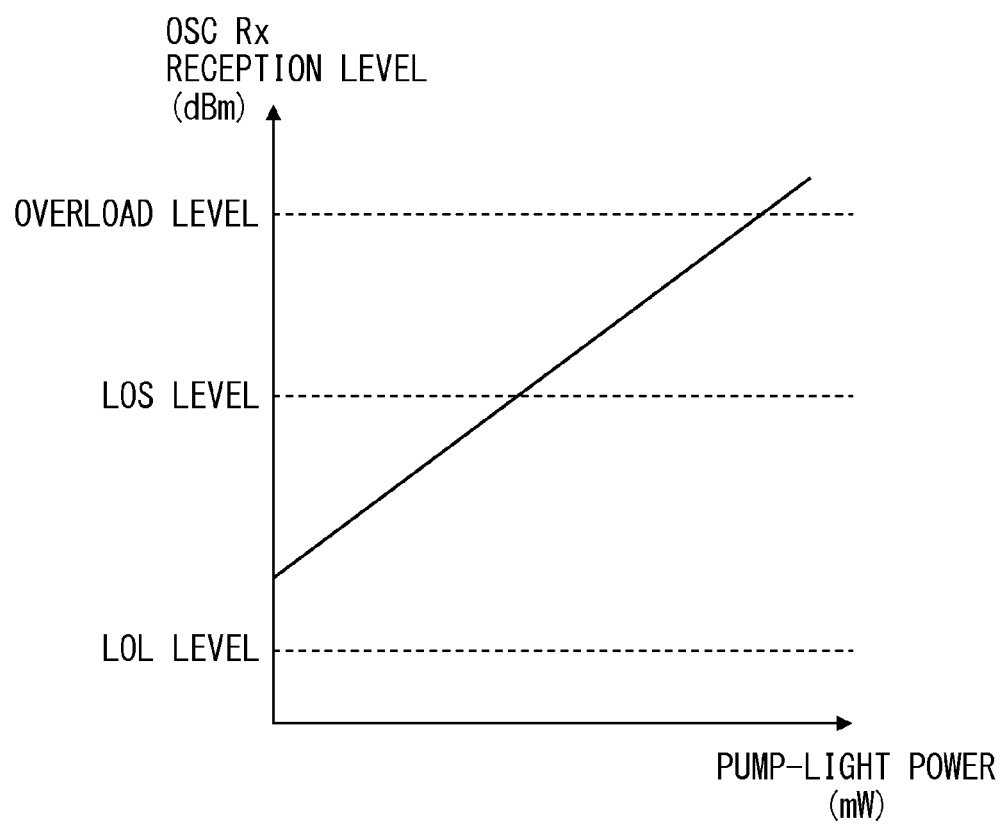
FIG. 3 illustrates a relationship between pump-light power and the power of an OSC wavelength component.

A Raman amplifier supplies pump light to a transmission optical fiber. Accordingly, the transmission optical fiber serves as a Raman-amplification medium. That is, the Raman amplifier may generate a Raman gain by supplying pump light to the transmission optical fiber.

FIG. 1 illustrates an exemplary configuration of a Raman amplifier in accordance with an embodiment of the present invention. A Raman amplifier 1 is optically connected or coupled to an output end of a transmission optical fiber 100. For example, the transmission optical fiber 100 is, but is not particularly limited to, a single-mode fiber. However, the transmission optical fiber 100 may be another type of fiber (e.g., a DSF).

An optical transmission equipment 200 is provided at a transmitting end of the transmission optical fiber 100. The optical transmission equipment 200 may generate an optical signal to transmit data. The optical signal generated by the optical transmission equipment 200 is, for example, a WDM optical signal. Light to transmit a data signal may hereinafter be referred to as "signal light".

The transmission equipment 200 includes an OSC (Optical Supervisory Channel) signal generator 201 and a multiplexer 202. The OSC signal generator (OSC_Tx) 201 generates an OSC signal. The OSC signal is one of supervisory signals to control the optical transmission system. The wavelength of the OSC signal is different from the wavelength of ant optical signals in the WDM optical signal, i.e., respective optical signals to transmit data. That is, the OSC signal is allocated outside the wavelength range of signal light. The multiplexer 202 may multiplex signal light and OSC light that transmits the OSC signal. Thus, the signal light and the OSC light are transmitted via the transmission optical fiber 100.

The Raman amplifier 1 includes a pump-light generator 10, a signal detection circuit 20, a power detection circuit 30, a measurement circuit 40, and a decision circuit 50. The Raman amplifier 1 is a distributed Raman amplifier that uses the transmission optical fiber 100 as an optical amplification medium via a stimulated Raman scattering effect.

The pump-light generator 10 includes a laser light source (LD) 11 and a multiplexer 12. The laser-light source 11 generates pump light having a power designated by the measurement circuit 40. The wavelength of the pump light is shorter than the wavelength range of the signal light by about 100 nm. The multiplexer 12 guides the pump light generated by the laser light source 11 to the transmission optical fiber 100. In this way, the pump-light generator 10 supplies pump light to the transmission optical fiber 100. Accordingly, the transmission optical fiber 100 serves as an optical amplification medium. The multiplexer 12 guides output light (signal light and OSC light) of the transmission optical fiber 100 to an output port. That is, the Raman amplifier 1 outputs an optical signal amplified by the transmission optical fiber 100.

The signal detection circuit 20 includes a demultiplexer 21, an OSC receiver (OSC_Rx) 22, an LOL detection circuit 23, and an LOS detection circuit 24. The demultiplexer 21 extracts an OSC wavelength component from the output light of the transmission optical fiber 100 and guides the extracted OSC wavelength component to the OSC receiver 22. The OSC receiver 22, which includes a photo detector, converts the OSC wavelength component extracted by the demultiplexer 21 into an electrical signal.

According to the electrical signal generated by the OSC receiver 22, the LOL (Loss-of-Light) detection circuit 23 compares the optical power of the OSC wavelength component with a specified LOL level. The optical power of the OSC wavelength component is calculated by, for example, averaging the electrical signal generated by the OSC receiver 22. The LOL level indicates a threshold that is used to decide whether or not light is present. Thus, the LOL level is determined according to, for example, the intensity of a dark current in the photo detector and the degree of electrical noise in the signal detection circuit 20. When the optical power of the OSC wavelength component is less than the LOL level, the LOL detection circuit 23 outputs an alarm. Thus, an alarm is output when an OSC wavelength component is buried under a dark current or electrical noise and thus is not detected.

According to the electric signal generated by the OSC receiver 22, the LOS (Loss-of-Signal) detection circuit 24 decides whether or not the output light of the transmission optical fiber 100 includes an OSC signal. For example, when the output signal of the OSC receiver 22 remains "0" or "1" for a specified time period (e.g., 100 µs), the LOS detection circuit 24 outputs an alarm indicating that the output light of the transmission optical fiber 100 does not include an OSC signal. Meanwhile, when detecting a change from "0" to "1" or from "1" to "0" within the specified time period above, the LOS detection circuit 24 decides that the output light of the transmission optical fiber 100 includes an OSC signal.

The power detection circuit 30 includes a demultiplexer 31 and a photo detector 32. The demultiplexer 31 extracts signal band light from the output light of the transmission optical fiber 100 and guides the signal band light to the photo detector 32. Note that the demultiplexer 31 may be an optical power splitter. The photo detector 32 converts the signal band light into an electric signal. The electric signal indicates the power of the signal band light output from the transmission optical fiber 100.

The measurement circuit 40 includes a selection circuit 41, an LD control circuit 42, and an ASS measurement circuit 43. The measurement circuit 40 measures a relationship between pump-light power and the power of noise output from the transmission optical fiber 100. In this example, the noise measured by the measurement circuit 40 is ASS.

In accordance with a result of detection by the LOS detection circuit 24, the selection circuit 41 selects a sweep direction of pump-light power for the measurement of the relationship between pump-light power and ASS power. In this case, in accordance with a result of detection by the LOS detection circuit 24, the selection circuit 41 selects one of the two modes, a mode in which the pump-light power increases from minimum pump-light power to maximum pump-light power, and a mode in which the pump-light power decreases from the maximum pump-light power to the minimum pump-light power.

The LD control circuit 42 designates pump-light power for the pump-light generator 10. When the measurement circuit 40 measures a relationship between pump-light power and ASS power, the LD control circuit 42 gives an instruction to the pump-light generator 10 to change the pump-light power in accordance with the mode selected by the selection circuit 41. In other words, the LD control circuit 42 controls the power of the pump light generated by the pump-light generator 10 in accordance with the mode selected by the selection circuit 41.

The ASS measurement circuit 43 measures a relationship between the pump-light power and ASS power according to the instruction of the pump-light power generated by the LD control circuit 42 and an output signal of the power detection circuit 30. The ASS measurement circuit 43 stores in a memory a result of a measurement of the relationship between the pump-light power and the ASS power. The memory is provided, for example, within the measurement circuit 40.

The decision circuit 50 includes a mask circuit 51 and a shutdown circuit 52. The decision circuit 50 determines a state of the transmission optical fiber 100 based on a monitoring result provided by the signal detection circuit 20.

When a specified condition is satisfied, the mask circuit 51 temporarily masks an output signal of the LOS detection circuit 24. The specified condition will be described hereinafter. Descriptions of a period during which the output signal of the LOS detection circuit 24 is masked will also be given later.

The shutdown circuit 52 determines the state of the transmission optical fiber 100 according to the monitoring result provided by the signal detection circuit 20. However, while the output signal of the LOS detection circuit 24 is being masked by the mask circuit 51, the shutdown circuit 52 does not determine the state of the transmission optical fiber 100. When the mask circuit 51 ends a mask process, the shutdown circuit 52 starts to determine the state of the transmission optical fiber 100. When the shutdown circuit 52 decides that the transmission optical fiber 100 has been disconnected, the shutdown circuit 52 shuts down the supply of pump light from the pump-light generator 10 to the transmission optical fiber 100. In this case, the shutdown circuit 52 may turn off the laser light source 11.

The measurement circuit 40 and the decision circuit 50 are implemented via, for example, a processor executing a program. However, the measurement circuit 40 and the decision circuit 50 may be achieved as hardware circuits. Alternatively, the measurement circuit 40 and the decision circuit 50 may be achieved as a combination of software and hardware.

The Raman amplifier 1 with the aforementioned configuration measures a relationship between pump-light power and ASS power in a startup process of starting up the Raman amplifier 1. The Raman amplifier 1 may control an amplifying operation according to the relationship between pump-light power and ASS power.

The startup process of starting up the Raman amplifier 1 is performed after the transmission optical fiber 100 is provided between the transmission equipment 200 and the Raman amplifier 1. The startup process is also performed before the optical transmission system starts an actual operation (i.e., before a data signal is transmitted from the transmission equipment 200). However, when the startup process is performed, the OSC signal is transmitted from the transmission equipment 200 via the transmission optical fiber 100.

<Background of Raman Amplifier in Accordance with the Embodiment>

While the optical transmission system is in operation, the Raman amplifier 1 controls pump-light power according to the optical power detected by the power detection circuit 30. In this case, the Raman amplifier 1 is operated in, for example, an AGC mode to maintain constant Raman gain or an ALC mode to maintain constant power of the output light of the transmission optical fiber 100.

The optical power detected by the power detection circuit 30 includes ASS power. Accordingly, to precisely perform AGC or ALC, ASS power is preferably deducted from the optical power detected by the power detection circuit 30.

In Raman amplification, as illustrated in FIG. 2, the ASS power in dBm is proportional to or almost proportional to the pump-light power in W (watt). The relationship between pump-light power and ASS power does not depend on whether or not signal light is present. Thus, if the relationship between pump-light power and ASS power is obtained in the startup process of starting up the Raman amplifier 1, ASS power can be calculated from pump-light power while the optical transmission system is in operation. Accordingly, pure signal-light power is calculated by deducting the ASS power calculated according to pump-light power from the optical power detected by the power detection circuit 30. Consequently, the Raman amplifier 1 may amplify an optical signal with a precise AGC or ALC.

Note that if a formula to indicate a relationship between pump-light power and ASS power is defined according to, for example, a type of and material of the transmission optical fiber 100, it is not necessary to measure ASS in the startup process of starting up the Raman amplifier. However, a loss incurred in a route from the laser light source 11 to the output end of the transmission optical fiber 100 (i.e., an end to which pump light is input) is different for each apparatus for which the Raman amplifier 1 is provided (this loss will hereinafter be referred to as an "in-apparatus loss"). In the case of, for example, an apparatus with many optical connectors in a route from the laser light source 11 to the output end of the transmission optical fiber 100, pump-light is subject to a great in-apparatus loss. That is, even though the laser light source 11 outputs the same output power, pump light having a different power enters the transmission optical fiber 100 when the in-apparatus loss is different. The gain of the Raman amplifier depends strongly on the power of the pump-light that enters the transmission optical fiber 100. Thus, even though the laser light source 11 outputs the same output power, the Raman gain becomes different when the in-apparatus loss is different.

The pump-light power in FIG. 2 is, for example, the output power of the laser light source 11. Characteristics A to C indicate results of measurement obtained for different in-apparatus losses when the transmission optical fibers are identical with each other. The characteristic A indicates a result of measurement for a small in-apparatus loss, and the characteristic C indicates a result of measurement for a large in-apparatus loss. The in-apparatus loss of the characteristic B is larger than that of the characteristic A and is smaller than that of the characteristic c. Thus, even when generated pump light has the same power, a different in-apparatus loss leads to different ASS power. Accordingly, to obtain a relationship between pump-light power and ASS power, it is preferable that ASS power actually be measured in the startup process of starting up the Raman amplifier.

In the measurement for obtaining a relationship between pump-light power and ASS power, signal light is not transmitted, but an OSC signal is transmitted. The OSC signal carries information to control the optical transmission system, so it is preferable that the OSC signal is transmitted in the startup process of starting up the Raman amplifier 1. The OSC signal is not guided to the photo detector 32, and hence the OSC signal does not affect the measuring of ASS power.

However, the OSC signal is Raman-amplified while the OSC signal is being transmitted via the transmission optical fiber 100. Thus, when pump-light power is too large in the measurement for obtaining a relationship between pump-light power and ASS power, the optical power of the OSC signal has a risk of exceeding the maximum rating or the overload level of the OSC receiver 22. Accordingly, ASS power is preferably measured using a procedure of gradually increasing the power of pump light from the minimum power.

When the OSC receiver 22 receives too much power, the gain of an amplifier that amplifies an electric signal indicative of a received optical signal is saturated, thereby causing waveform distortion. The waveform distortion degrades the bit error rate of a recovered signal. The overload level defines the optical power that causes such degradation. That is, the pump light provided by the Raman amplifier is controlled to be within a region in which the optical power of an OSC signal is less than the overload level.

In the measurement for obtaining a relationship between pump-light power and ASS power, an OSC signal is used to decide a state of the transmission optical fiber 100. As an example, the Raman amplifier decides whether or not the transmission optical fiber 100 has been disconnected by monitoring LOL and LOS for an OSC wavelength component.

FIG. 3 illustrates a relationship between pump-light power and the optical power of an OSC wavelength component. An LOL level is a threshold to decide whether or not an OSC wavelength component is present in the OSC receiver 22, and the LOL level is determined according to, for example, the intensity of a dark current in the photo detector and the degree of electrical noise in the signal detection circuit 20. Note that "LOL is detected" means that the optical power of an OSC signal component is small to the extent that an OSC wavelength component converted into an electric signal by the photo detector in the OSC receiver 22 cannot be detected due to a dark current or electrical noise.

An LOS level indicates the minimum optical power with which the OSC signal is detectable when the output light of the transmission optical fiber 100 includes an OSC signal. That is, when the output light of the transmission optical fiber 100 includes an OSC signal and the optical power of an OSC wavelength component is greater than the LOS level, the signal detection circuit 20 can detect the OSC signal. Meanwhile, even when the output light of the transmission optical fiber 100 includes an OSC signal, the signal detection circuit 20 is incapable of detecting the OSC signal when the optical power of the OSC wavelength component is less than the LOS level.

As described above, the LOL level is a threshold to decide whether or not received light is present. By contrast, the LOS level indicates the optical power at which it becomes possible to decide whether or not a signal is included in received light. Thus, the LOS level is higher than the LOL level. In addition, the overload level is higher than the LOS level.

In the example depicted in FIG. 3, when pump-light power is zero, the optical power of the OSC wavelength component is higher than the LOL level. Raman amplification does not occur when pump light is not supplied to the transmission optical fiber 100. That is, when pump light is not supplied to the transmission optical fiber 100, ASS is also substantially zero, and the optical power of the OSC wavelength component detected at the OSC receiver 22 results from an OSC signal transmitted from the transmission equipment 200. Thus, when the optical power of the OSC wavelength component is higher than the LOL level without pump light, it may be decided that the OSC signal transmitted from the transmission equipment 200 has reached the OSC receiver 22 of the Raman amplifier 1. In this case, it may be decided that the transmission optical fiber normally connect the transmission equipment 200 to the Raman amplifier 1.

Subsequently, ASS power is measured while gradually increasing pump-light power so as to obtain a relationship between pump-light power and ASS power. In this measuring procedure, the optical power of the OSC wavelength component also increases as illustrated in FIG. 3.

For example, in the process of obtaining a relationship between pump-light power and ASS power, a measurement is performed while gradually increasing the power of pump light from the minimum power, as described above. In this case, laser oscillation may become unstable if the power of the laser light source 11 is too low. Thus, the minimum pump-light power for the measurement above is selected to the extent that the oscillation of the laser light source 11 does not become unstable.

Figure 4:
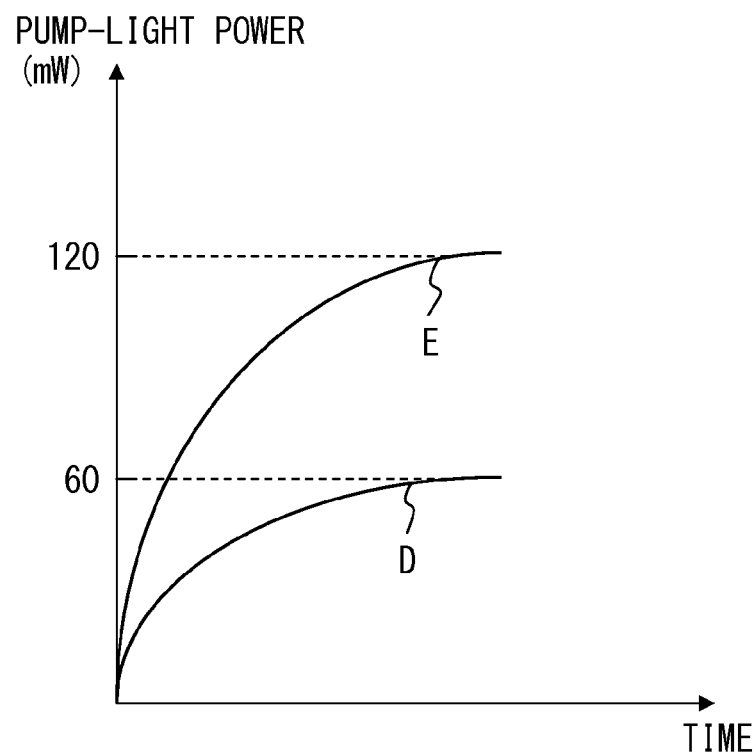
FIG. 4 illustrates a start-up characteristic of a laser light source.

FIG. 4 illustrates a start-up characteristic of the laser light source 11. A characteristic D indicates a change in pump-light power that is made when an instruction to output pump light of 60 mW is given to the laser light source 11 in an OFF state. A characteristic E indicates a change in pump-light power that is made when an instruction to output pump light of 120 mW is given to the laser light source 11 in an OFF state. As illustrated, a certain period of time is required to stabilize the output power (i.e., pump-light power) of the laser light source 11 after a drive condition (e.g., a driving current) of the laser light source 11 is changed. In Raman amplification, when a number of wavelengths of a WDM optical signal changes while pump-light power is constant, Raman gain is substantially constant. Thus, since the Raman amplifier is seldom requested to make a fast response, the Raman amplifier includes a control circuit and a driving circuit both having a simple configuration and often uses a low-cost laser element. Accordingly, in comparison with, for example, EDFAs, the Raman amplifier often takes a longtime to stabilize pump-light power after a drive condition of the laser light source 11 is changed. The following descriptions are based on the assumption that one second is required to stabilize pump-light power after a drive condition of the laser light source 11 is changed (an LD power stabilization time period).

As described above, the measurement circuit 40 measures ASS power while changing pump-light power. For each measurement point (i.e., for each value of pump-light power), the measurement circuit 40 measures ASS power after pump-light power is stabilized. That is, the period of measurement time for each measurement point is one second or longer.

Figure 5A:
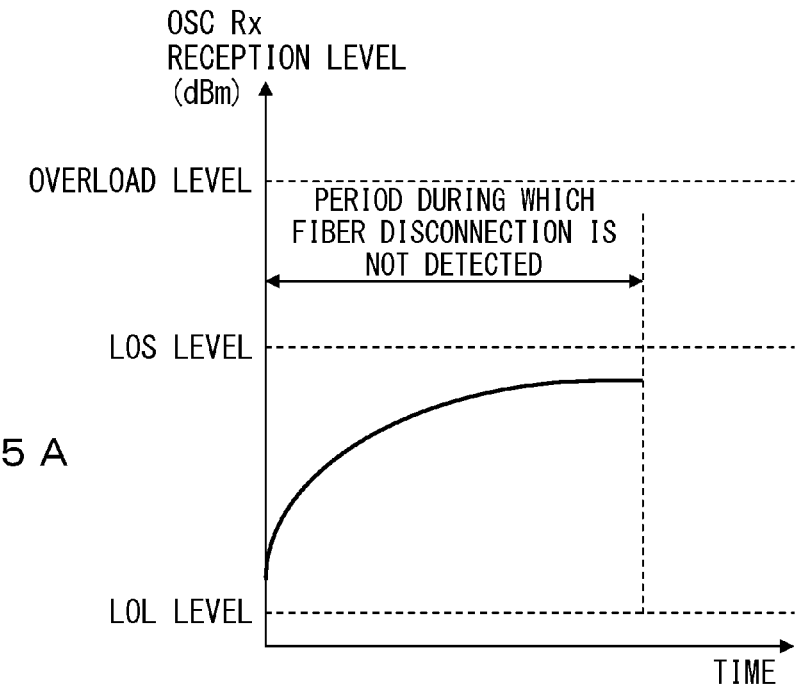
FIG. 5A and FIG. 5B illustrate a change in the optical power of an OSC wavelength component.

FIG. 5A illustrates a change in the optical power of an OSC wavelength component that is made at an initial measurement point. Assume that an instruction to output the pump light having target power is given to the laser light source 11 in an OFF state. At the initial measurement point, the target power corresponds to the minimum pump-light power.

In response to the aforementioned instruction to the laser light source 11, pump-light power gradually increases as illustrated in FIG. 4. About one second after the aforementioned instruction has been given to the laser light source 11, pump-light power reaches the target power and stabilizes. In this case, the OSC wavelength component is amplified in the transmission optical fiber 100 by the pump light. However, pump-light power gradually increases as described above. Thus, the optical power of the OSC wavelength component also gradually increases as illustrated in FIG. 5A. In the example illustrated in FIG. 5A, even when pump-light power reaches the target power, the optical power of the OSC wavelength component is less than the LOS level. Such a situation occurs when a great loss is made in the transmission optical fiber 100, i.e., a route from the transmission equipment 200 to the Raman amplifier 1.

Figure 5B:
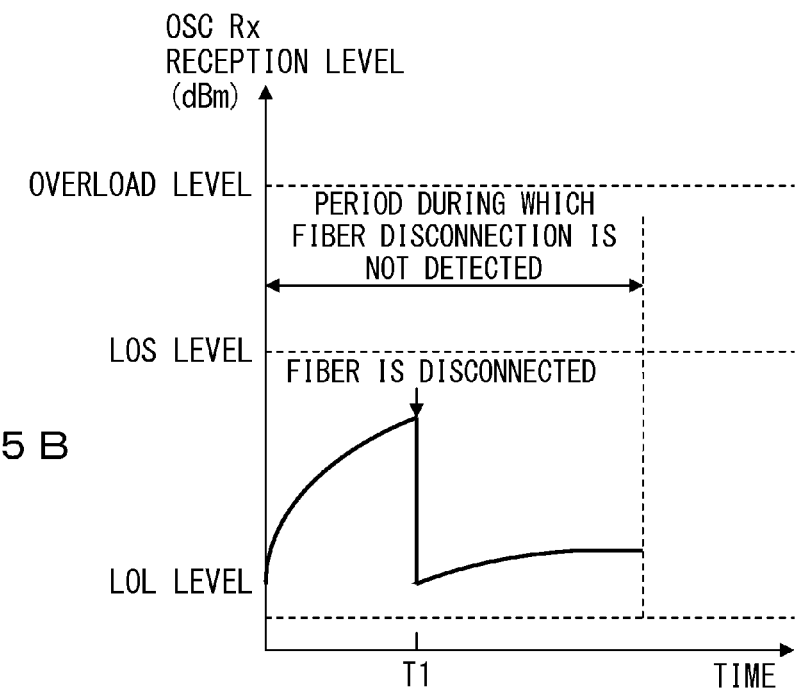

FIG. 5B illustrates a change in the optical power of an OSC wavelength component that is made when the transmission optical fiber 100 is disconnected during measurement. The control of pump-light power illustrated in FIG. 5A is the same as that in FIG. 5B.

In response to an instruction for the laser light source 11 to output the pump light having a target power, pump-light power gradually increases, and the optical power of an OSC wavelength component also gradually increases. Assume that the transmission optical fiber 100 is disconnected at time T1. Accordingly, an OSC signal transmitted from the transmission equipment 200 does not reach the Raman amplifier 1, and, consequently, the optical power of the OSC wavelength component suddenly decreases.

However, when the transmission optical fiber 100 is disconnected at a spot distant from the Raman amplifier 1, pump light continues to be supplied to the transmission optical fiber 100, and hence the transmission optical fiber 100 continues to serve as an optical-amplification medium. ASS that occurs in the transmission optical fiber 100 is also includes the OSC wavelength component. That is, the ASS of the OSC wavelength component also occurs after the transmission optical fiber 100 is disconnected. Thus, in the example illustrated in FIG. 5B, the optical power of the OSC wavelength component remains higher than the LOL level even after the transmission optical fiber 100 is disconnected.

In addition, after time T1, as pump-light power increases, the optical power of the OSC wavelength component that results from ASS also increases. However, assume that even though pump-light power reaches the target power, the optical power of the OSC wavelength component remains less than the LOS level.

Next, a method will be analyzed for deciding a state of the transmission optical fiber 100 using the OSC signal. In the example illustrated in FIG. 5B, even though the transmission optical fiber 100 is disconnected at time T1, the optical power of the OSC wavelength component remains higher than the LOL level. Thus, in this case, disconnection of the transmission optical fiber 100 cannot be detected by monitoring LOL. In the example illustrated in FIG. 5A or FIG. 5B, when pump-light power is controlled to be a target power (in this example, the minimum pump-light power), the optical power of the OSC wavelength component remains less than the LOS level. Thus, in this case, disconnection of the transmission optical fiber 100 cannot be detected by monitoring LOS.

As described above, when the optical power of the OSC wavelength component without pump light is less than the LOS level and the measurement to obtain a relationship between pump-light power and ASS power is started from the minimum pump-light power as an initial power, disconnection of the transmission optical fiber 100 may be unable to be detected using the OSC signal. In this case, as illustrated in FIG. 5A and FIG. 5B, disconnection of the transmission optical fiber 100 cannot be detected during the period of the initial measurement (i.e., the period during which ASS power is measured with pump-light power being controlled to be the "minimum power"). The time required to measure ASS power with respect to one value of pump-light power is longer than the time required to stabilize pump-light power. Thus, in this case, disconnection of the transmission optical fiber 100 cannot be detected for at least one second.

<Operations of Raman Amplifier in Accordance with the Embodiment>

The Raman amplifier 1 in accordance with the embodiment includes a function to shorten a period of time during which disconnection of the transmission optical fiber 100 cannot be detected. This function is achieved using the selection circuit 41 and the mask circuit 51 illustrated in FIG. 1.

In accordance with a result of detection by the LOS detection circuit 24, the selection circuit 41 selects a sweep direction of pump-light power in the measurement of the relationship between pump-light power and ASS power. For example, when the optical power of an OSC wavelength component is higher than or equal to the LOS level while pump light is not being supplied to the transmission optical fiber 100, the selection circuit 41 selects a first measurement mode to increase pump-light power from minimum pump-light power to maximum pump-light power. Meanwhile, when the optical power of the OSC wavelength component is lower than the LOS level while pump light is not being supplied to the transmission optical fiber 100, the selection circuit 41 selects a second measurement mode to decrease pump-light power from the maximum pump-light power to the minimum pump-light power.

Figure 6A:
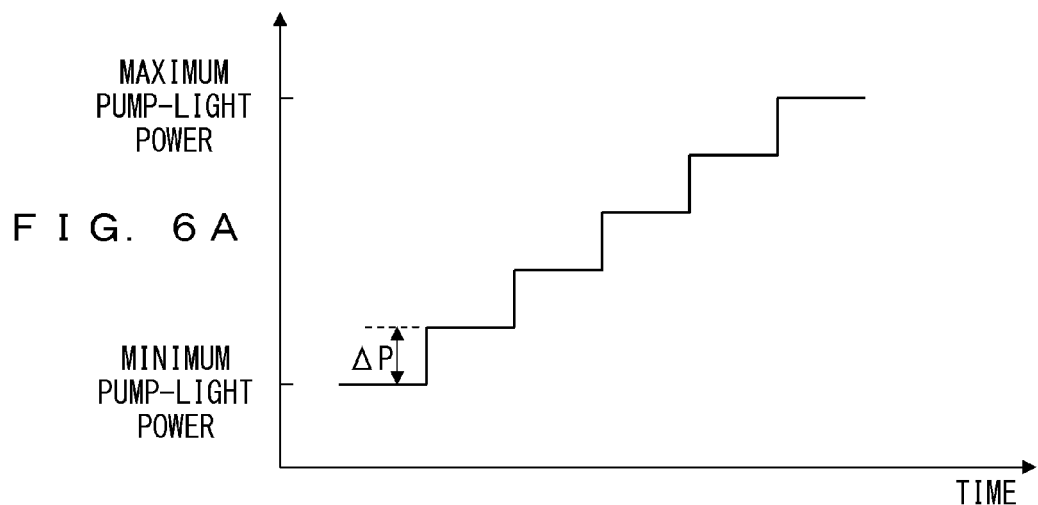
FIG. 6A and FIG. 6B illustrate a method for controlling pump-light power in ASS measurement.

FIG. 6A illustrates the pump-light power provided when the first measurement mode is selected. In the first measurement mode, the measurement circuit 40 first measures ASS power while controlling pump-light power to be the "minimum pump-light power". Then, the measurement circuit 40 measures ASS power while controlling pump-light power to be "minimum pump-light power+ΔP". Subsequently, the measurement circuit 40 sequentially increases the pump-light power by ΔP for each measurement of ASS power. Finally, the measurement circuit 40 measures ASS power while controlling pump-light power to be the "maximum pump-light power". After this, the measurement circuit 40 stores the values of ASS power obtained from the measurement in a memory in association with pump-light power.

Figure 6B:
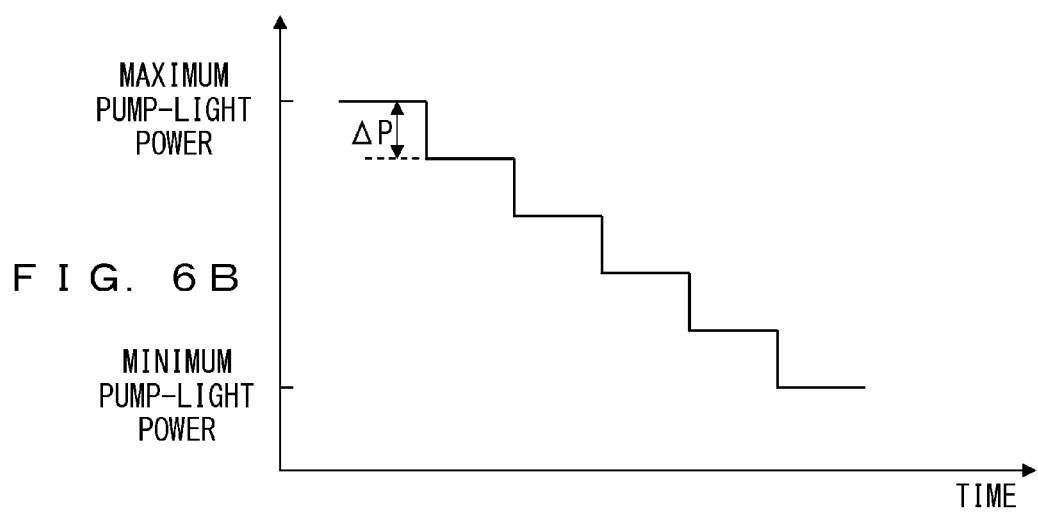

FIG. 6B illustrates the pump-light power provided when the second measurement mode is selected. In the second measurement mode, the measurement circuit 40 first measures ASS power while controlling pump-light power to be the "maximum pump-light power". Then, the measurement circuit 40 measures ASS power while controlling pump-light power to be "maximum pump-light power−ΔP". Subsequently, the measurement circuit 40 sequentially decreases the pump-light power by ΔP for each measurement of ASS power. Finally, the measurement circuit 40 measures ASS power while controlling pump-light power to be the "minimum pump-light power". After this, the measurement circuit 40 stores the values of ASS power obtained from the measurement in a memory in association with pump-light power.

The mask circuit 51 temporarily masks an output signal of the LOS detection circuit 24 when a specified condition is satisfied. In the following, descriptions will be given of the specified condition and of a period of time during which the output signal of the LOS detection circuit 24 is masked.

FIG. 7 illustrates a change in pump-light power and a change in the optical power of an OSC wavelength component at the start of measurement. In this example, at the start of measurement, an instruction to output the maximum pump-light power is given to the laser light source 11 in the OFF state.

After the laser light source 11 starts to be driven in accordance with the aforementioned instruction, pump-light power gradually increases. In this example, pump-light power is stabilized in about one second after the aforementioned instruction is given.

While pump-light power increases, the optical power of the OSC wavelength component also increases. The example illustrated in FIG. 7 is based on the assumption that the optical power of the OSC wavelength component is at the LOL level when pump-light power is zero. The optical power of the OSC wavelength component exceeds the LOS level at the moment when 300 ms have elapsed after pump-light power started to increase.

As described above, it takes 300 ms to increase the optical power of the OSC wavelength component from the LOL level to the LOS level in response to the start of the driving of the laser light source 11. In this case, when the optical power of the OSC wavelength component is higher than the LOL level without pump light, the optical power of the OSC wavelength component will exceed the LOS level at the moment when 300 ms have elapsed after the laser light source 11 started to be driven. Note that the period of time required to increase the optical power of the OSC wavelength component in FIG. 7 from the LOL level to the LOS level (in this example, 300 ms) may hereinafter be referred to as an "LOS arrival time".

The mask circuit 51 temporarily masks an output signal of the LOS detection circuit 24. The masking time (a period of time for masking the signal) is made to be equal to or longer than the LOS arrival time. As an example, the mask circuit 51 masks an output signal of the LOS detection circuit 24 for a period of the LOS arrival time.

FIG. 8 is a flowchart illustrating a method for measuring a relationship between pump-light power and ASS power. The process of the flowchart is performed by the measurement circuit 40 and the decision circuit 50. This measuring method includes a step of deciding a state of the transmission optical fiber 100.

Note that the process of the flowchart illustrated in FIG. 8 is performed before a data signal is transmitted via the transmission optical fiber 100. However, the transmission equipment 200 continuously transmits the OSC signal. At the moment when the measurement that follows the flowchart starts, the laser light source 11 has been shut down and pump light has not been generated.

In S1, the decision circuit 50 decides whether or not LOL has been detected by the LOL detection circuit 23. The LOL detection circuit 23 detects LOL when the optical power of an OSC wavelength component is less than the LOL level. When LOL is detected, the decision circuit 50 decides that the transmission optical fiber 100 has been disconnected between the transmission equipment 200 and the Raman amplifier 1. In this case, the shutdown circuit 52 maintains the shutdown of the laser light source 11.

When LOL is not detected (No in S1), the decision circuit 50 decides that the transmission optical fiber 100 connects the transmission equipment 200 to the Raman amplifier 1. In this case, the process of the measuring method shifts to S2.

In S2, the decision circuit 50 decides whether or not LOS has been detected by the LOS detection circuit 24. The LOS detection circuit 24 detects LOS when the level of the OSC wavelength component remains "0" or "1" for a specified time period (e.g., for 100 μs). When LOS is not detected, the process of the measuring method shifts to S3. Meanwhile, when LOS is detected, the process of the measuring method shifts to S4.

In S3, the selection circuit 41 selects the first measurement mode. Accordingly, the LD control circuit 42 gives an instruction for the laser light source 11 to control pump-light power to be the "minimum pump-light power" as illustrated in FIG. 6A.

In S4, the selection circuit 41 selects the second measurement mode. Accordingly, the LD control circuit 42 gives an instruction for the laser light source 11 to control pump-light power to be the "maximum pump-light power" as illustrated in FIG. 6B. In S5, the mask circuit 51 masks an output signal of the LOS detection circuit 24 until a specified masking time elapses after the LD control circuit 42 gives the instruction in S4 to the laser light source 11. Thus, during the masking period, the shutdown circuit 52 does not receive the output signal of the LOS detection circuit 24.

In S6, the shutdown circuit 52 decides whether or not LOS has been detected by the LOS detection circuit 24. When LOS is not detected, the process of the measuring method shifts to S7. Meanwhile, when LOS is detected, the process of the measuring method shifts to S10.

In S7, the ASS measurement circuit 43 waits for a specified time period to elapse after new pump-light power was instructed in S3, S4, or S9. This specified time period corresponds to the time required to stabilize pump-light power. Assume that the time required to stabilize pump-light power is known in advance. In S8, the ASS measurement circuit 43 measures ASS power. ASS power is obtained by reading an output signal of the photo detector 32. In S9, the LD control circuit 42 gives an instruction for the laser light source 11 to control pump-light power to be a next measurement point. In the first measurement mode, an instruction to increase pump-light power by ΔP is given to the laser light source 11. In the second measurement mode, an instruction to decrease pump-light power by ΔP is given to the laser light source 11.

As described above, the Raman amplifier 1 repeatedly performs the processes of S6 to S9. Accordingly, ASS power is measured for a plurality of measurement points between the minimum pump-light power and the maximum pump-light power. Although not illustrated, the process of the flowchart ends when ASS power has been measured for all of the values of pump-light power.

When LOS is detected in S6, the shutdown circuit 52 shuts down the laser light source 11 in S10. This process stops pump light from being generated. Subsequently, the decision circuit 50 decides in S11 whether or not LOL has been detected. When LOL has been detected, the process of the measuring method returns to S1. Meanwhile, when LOL has not been detected, the process of the measuring method ends.

Next, with reference to the aforementioned flowchart, descriptions of deciding the state of the transmission optical fiber 100 will be given.

When LOS is not detected in S2 it is considered that the optical power of the OSC wavelength component is higher than the LOS level without pump light. In addition, when LOS is not detected in S2, the first measurement mode depicted in FIG. 6A is selected, thus pump-light power increases from the minimum pump-light power to the maximum pump-light power during the measurement. In this case, during the ASS measurement, as pump-light power increases, the optical power of the OSC wavelength component also increases. Accordingly, as long as the transmission optical fiber 100 is in a normal state, the optical power of the OSC wavelength component will always be higher than the LOS level during the ASS measurement. In other words, when the optical power of the OSC wavelength component becomes less than the LOS level during the ASS measurement, it is decided that the transmission optical fiber 100 has been disconnected.

Accordingly, the shutdown circuit 52 may decide the state of the transmission optical fiber 100 by monitoring an output signal of the LOS detection circuit 24. That is, the output signal of the LOS detection circuit 24 is used for deciding the state of the transmission optical fiber 100.

Meanwhile, when LOS is detected it is considered that the optical power of the OSC wavelength component is less than the LOS level without pump light. Thus, the second measurement mode depicted in FIG. 6B is selected when LOS is detected in S2. In this case, the "maximum pump-light power" is set as an initial value of pump-light power in the measurement of ASS power. Accordingly, the optical power of the OSC wavelength component rapidly increases and exceeds the LOS level, as illustrated in FIG. 7.

After that, in the second measurement mode, pump-light power decreases from the maximum pump-light power to the minimum pump-light power. Note that the same method is used for deciding the state of the transmission optical fiber 100 by using an output signal of the LOS detection circuit 24 in the first and second measurement modes.

As described, the method for deciding the state of the transmission optical fiber 100 by using an output signal of the LOS detection circuit 24 is performable when the optical power of the OSC wavelength component is higher than the LOS level. However, when the second measurement mode is selected, the period of transition of pump-light power from zero to the maximum pump-light power in the initial measurement process includes a period of time during which the optical power of the OSC wavelength component is less than the LOS level. For example, in the example illustrated in FIG. 7, the optical power of the OSC wavelength component is less than the LOS level for 300 ms after the LD control circuit 42 gave the laser light source 11 an instruction to generate pump light. While the optical power of the OSC wavelength component is less than the LOS level, the state of the transmission optical fiber 100 cannot be decided using an output signal of the LOS detection circuit 24.

Accordingly, in the Raman amplifier 1 of the embodiment, during the period in which it is supposed that the optical power of the OSC wavelength component is less than the LOS level, the mask circuit 51 masks the output signal of the LOS detection circuit 24. During this period, the shutdown circuit 52 does not decide the state of the transmission optical fiber 100 (alternatively, the shutdown circuit 52 does not perform an operation to shut down the laser light source 11).

When the aforementioned masking period ends, the optical power of the OSC wavelength component is higher than the LOS level. Thus, after the masking period ends, the shutdown circuit 52 may decide the state of the transmission optical fiber 100 according to the output signal of the LOS detection circuit 24. Assume, for example, that the transmission optical fiber 100 is disconnected at time T2 in FIG. 7. In this case, the optical power of the OSC wavelength component becomes less than the LOS level, as indicated by the dashed line. This disables the LOS detection circuit 24 from detecting a level change of the OSC wavelength component (a change from "0" to "1" or from "1" to "0"), and hence an alarm signal is output to indicate that the OSC wavelength component does not include an OSC signal. Accordingly, the shutdown circuit 52 may detect disconnection of the transmission optical fiber 100 by monitoring the output signal of the LOS detection circuit 24.

As described above, during the period in which the mask circuit 51 masks the output signal of the LOS detection circuit 24, the Raman amplifier 1 in accordance with the embodiment is not capable of deciding the state of the transmission optical fiber 100. In the example illustrated in FIG. 7, this period is about 300 ms.

By contrast, a Raman amplifier that does not include the selection circuit 41 and the mask circuit 51 may be incapable of deciding the state of the transmission optical fiber 100 for a period that is longer than the time required to stabilize pump-light power (the LD power stabilization time period), as described above with reference to FIG. 5A and FIG. 5B. In the examples depicted in FIG. 5A and FIG. 5B, disconnection of the transmission optical fiber 100 is unable to be detected for one second or more.

Accordingly, the Raman amplifier 1 in accordance with the embodiment shortens the period of time during which disconnection of the transmission optical fiber 100 cannot be detected.

When the optical power of the OSC wavelength component is less than the LOS level without pump light, and in the case of a configuration in which ASS measurement is started from the minimum pump-light power as an initial power, the optical power of the OSC wavelength component may fail to reach the LOS level in the initial measurement. This extends the period of time during which disconnection of the transmission optical fiber 100 cannot be detected. By contrast, the Raman amplifier 1 in accordance with the embodiment starts ASS measurement from the maximum pump-light power as an initial power when the optical power of the OSC wavelength component is less than the LOS level without pump light. Accordingly, the optical power of the OSC wavelength component exceeds the LOS level in a short time. Consequently, the Raman amplifier 1 in accordance with the embodiment shortens the period of time during which disconnection of the transmission optical fiber 100 cannot be detected.

FIG. 9 illustrates an exemplary operation of the Raman amplifier 1. In this example, the optical power of an OSC wavelength component is higher than the LOL level and less than the LOS level without pump light. Thus, the second measurement mode is selected in S4 of FIG. 8.

In the second measurement mode, pump-light power is controlled to be the maximum pump-light power for the initial measurement. Then, after pump-light power is stabilized, the ASS measurement circuit 43 measures ASS power. At that time, the optical power of the OSC wavelength component is higher than the LOS level.

Then, the measurement circuit 40 performs measurements 2, 3, and 4 while sequentially decreasing pump-light power by ΔP. After measurement 4 is finished, the optical power of the OSC wavelength component is still higher than the LOS level.

Subsequently, when pump-light power is further decreased by ΔP, the optical power of the OSC wavelength component becomes less than the LOS level. Accordingly, the LOS detection circuit 24 becomes unable to detect an OSC signal and thus outputs an alarm. By so doing, the shutdown circuit 52 shuts down pump light in S10. When, for example, the alarm is continuously output for a specified period of time (e.g., 300 ms), the shutdown circuit 52 may shut down pump light.

In S11, it is decided whether or not the detection of LOS results from disconnection of the transmission optical fiber 100. That is, when pump light is shut down in S10 and then LOL is then detected in S11, the decision circuit 50 decides that the transmission optical fiber 100 has been disconnected. In this case, after restoring the transmission optical fiber 100, the measurement circuit 40 measures ASS power. Meanwhile, when LOL is not detected in S11 after pump light is shut down in S10, the decision circuit 50 decides that the transmission optical fiber 100 is being normally operated. Such a situation occurs when a distance is long between the transmission equipment 200 and the Raman amplifier 1. However, since the optical transmission system would not be operated with such a low gain that an OSC signal is not detected, skipping the measuring of ASS for lower pump-light power after S6 causes no problem.

First Example

In the following, examples of specific values will be indicated. Signal light is allocated in L band. The wavelength capacity of WDM is 80. The transmission optical fiber is a dispersion-shifted fiber. The pump-light generator 10 includes four LDs of different wavelengths. Each pump light is allocated near 1480 nm. The minimum power and the maximum power of each pump light are respectively 65 mW and 125 mW. The LDs are driven to equalize the four pump-light powers.

The transmission equipment 200 outputs the OSC signal of 0 dBm. The transmission rate of the OSC signal is 155 Mbps. An OSC wavelength to transmit the OSC signal is 1530±10 nm.

The demultiplexer 21 extracts and guides light with wavelength of 1520 nm to 1540 nm to the OSC receiver 22. In the OSC receiver 22, the overload level is −7 dBm, the LOS level is −31 dBm, and the LOL level is −36 dBm. Thus, when a span loss of the OSC band is 31 dB to 36 dB, the optical power of the OSC wavelength component corresponds to a value between the LOL level and the LOS level without pump light. That is, the optical transmission system is designed in a manner such that the span loss of the OSC band between the transmission equipment 200 and the Raman amplifier 1 is 31 dB to 36 dB.

When pump-light power is 125 mW, the Raman gain of the OSC band is 13 dB. The span loss of the OSC band is 31 dB or more. Thus, the reception level of OSC does not exceed the overload level.

When pump-light power is 65 mW, the Raman gain of the OSC band is 4 dB. Assume that the span loss of the OSC band is 36 dB. Accordingly, the reception level of OSC is −32 dBm, which is less than the LOS level. Further, assume that the power of the ASS guided to the OSC receiver 22 (i.e., the ASS within a wavelength range of 1520 nm to 1540 nm) is higher than the LOL level (i.e., −36 dBm). In this case, LOL is not detected even when, for example, the transmission optical fiber 100 is disconnected at a transmitting end of the transmission equipment 200.

In the aforementioned case, if a measurement to obtain a relationship between pump-light power and ASS power starts from the minimum pump-light power, there is a time period of one second or more not to be capable of detecting disconnection of the transmission optical fiber 100. The Raman amplifier 1 in accordance with the embodiment may starts the measurement from the maximum pump-light power, thus may shorten the period of time during which disconnection of the transmission optical fiber 100 cannot be detected.

Second Embodiment

In the configuration illustrated in FIG. 1, the state of the transmission optical fiber 100 is decided using LOS. However, the present invention is not limited to this configuration. That is, the decision circuit 50 may decide the state of the transmission optical fiber 100 using, for example, LOF (Loss-of Frame) instead of LOS.

In this case, the signal detection circuit 20 includes a frame recovery circuit that recovers a frame from OSC light. When frame synchronization is not established in a specified period of time (e.g., 3 ms), the signal detection circuit 20 outputs an alarm signal.

The other elements are substantially the same as those depicted in FIG. 1. That is, when LOF is not detected while pump light is not being supplied, the selection circuit 41 selects the first measurement mode. Meanwhile, when LOF is detected while pump light is not being supplied, the selection circuit 41 selects the second measurement mode. The mask circuit 51 masks a signal indicative of LOF for a specified period of time.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A Raman amplifier comprising:
a pump-light generator configured to supply pump light to a transmission optical fiber;
a measurement circuit configured to measure a relationship between power of the pump light and power of noise output from the transmission optical fiber with respect to a range from first pump-light power to second pump-light power that is higher than the first pump-light power;
a signal detector configured to monitor a supervisory signal transmitted from a transmission equipment provided at a transmitting end of the transmission optical fiber in output light of the transmission optical fiber; and
a decision unit configured to decide a state of the transmission optical fiber according to a monitoring result provided by the signal detector, wherein
when the supervisory signal is detected by the signal detector while the pump light is not supplied to the transmission optical fiber, the measurement circuit measures the relationship while increasing the power of the pump light from the first pump-light power to the second pump-light power, and
when the supervisory signal is not detected by the signal detector while the pump light is not supplied to the transmission optical fiber, the measurement circuit measures the relationship while decreasing the power of the pump light from the second pump-light power to the first pump-light power.

2. The Raman amplifier according to claim 1, wherein when the supervisory signal is not detected by the signal detector while the pump light is not supplied to the transmission optical fiber, the decision unit decides the state of the transmission optical fiber according to the monitoring result provided by the signal detector after a specified period of time has elapsed since an instruction to generate pump light with the second pump-light power was given to the pump-light generator.

3. The Raman amplifier according to claim 1, wherein when the supervisory signal is not detected by the signal detector while the measurement circuit measures the relationship, the decision unit decides that the transmission optical fiber has been disconnected.

4. The Raman amplifier according to claim 1, wherein when the supervisory signal is not detected by the signal detector while the measurement circuit measures the relationship, the decision unit shuts down the supply of the pump light from the pump-light generator to the transmission optical fiber.

5. The Raman amplifier according to claim 1, further comprising
a power detector configured to detect power of the output light of the transmission optical fiber in a specified wavelength range, wherein
the measurement circuit measures the power of the noise using the power detector with respect to a range from the first pump-light power to the second pump-light power, and
the supervisory signal is allocated outside the specified wavelength range.

6. The Raman amplifier according to claim 2, wherein the specified period of time is equal to or longer than a period of time required to increase the pump-light power from a level to decide whether or not light having a wavelength of the supervisory signal is present to a level to decide whether or not the supervisory signal is present when the pump-light generator shifts from a state not to generate the pump light to a state to generate the pump light with the second pump-light power.

7. The Raman amplifier according to claim 6, wherein the specified period of time is shorter than a period of time required to stabilize a Raman gain of the transmission optical fiber after an instruction to control the pump-light power has been given to the pump-light generator.

8. A Raman amplifier comprising:
a pump-light generator configured to supply pump light to a transmission optical fiber;

a measurement circuit configured to measure a relationship between power of the pump light and power of noise output from the transmission optical fiber with respect to a range from first pump-light power to second pump-light power that is higher than the first pump-light power;

a signal detector configured to monitor a synchronization of a frame transmitted from a transmission equipment provided at a transmitting end of the transmission optical fiber in output light of the transmission optical fiber; and a decision unit configured to decide a state of the transmission optical fiber according to a monitoring result provided by the signal detector, wherein when the synchronization of the frame is detected by the signal detector while the pump light is not supplied to the transmission optical fiber, the measurement circuit measures the relationship while increasing the power of the pump light from the first pump-light power to the second pump-light power, and when the synchronization of the frame is not detected by the signal detector while the pump light is not supplied to the transmission optical fiber, the measurement circuit measures the relationship while decreasing the power of the pump light from the second pump-light power to the first pump-light power.

* * * * *